US008089895B1

(12) United States Patent
Mackie (10) Patent No.: US 8,089,895 B1
(45) Date of Patent: Jan. 3, 2012

(54) ADAPTIVE NETWORK FLOW ANALYSIS

(75) Inventor: Scott Mackie, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 693 days.

(21) Appl. No.: 12/200,581

(22) Filed: Aug. 28, 2008

Related U.S. Application Data (63) Continuation of application No. 10/188,567, filed on Jul. 2, 2002, now Pat. No. 7,420,929.

(51) Int. Cl.
*H04J 1/16* (2006.01)
(52) U.S. Cl. ........................................ 370/252; 370/338
(58) Field of Classification Search .................. 370/252, 370/253, 254, 278, 310.2, 312, 328, 338, 370/349, 354, 356, 360, 374, 471, 401, 408, 370/484, 395.3, 395.52; 709/224, 238
See application file for complete search history.

(56) References Cited

U.S. PATENT DOCUMENTS

| | | |
|---|---|---|
| 3,962,681 A | 6/1976 | Requa et al. |
| 4,032,899 A | 6/1977 | Jenny et al. |
| 4,600,319 A | 7/1986 | Everett, Jr. |
| 5,375,216 A | 12/1994 | Moyer et al. |
| 5,408,539 A | 4/1995 | Finlay et al. |
| 5,490,252 A | 2/1996 | Macera et al. |
| 5,509,123 A | 4/1996 | Dobbins et al. |
| 5,530,958 A | 6/1996 | Agarwal et al. |
| 5,568,471 A | 10/1996 | Hershey et al. |
| 6,011,795 A | 1/2000 | Varghese et al. |
| 6,018,765 A | 1/2000 | Durana et al. |
| 6,148,335 A | 11/2000 | Haggard et al. |
| 6,182,146 B1 | 1/2001 | Graham-Cumming, Jr. |
| 6,321,338 B1 | 11/2001 | Porras et al. |
| 6,392,996 B1 | 5/2002 | Hjalmtysson |
| 6,499,088 B1 | 12/2002 | Wexler et al. |
| 6,501,752 B1 | 12/2002 | Kung et al. |
| 6,563,796 B1 | 5/2003 | Saito |
| 6,584,548 B1 | 6/2003 | Bourne et al. |

(Continued)

FOREIGN PATENT DOCUMENTS

WO WO 98/36532 A1 8/1998

(Continued)

OTHER PUBLICATIONS

"The CAIDA Web Site," www.caida.org.

(Continued)

*Primary Examiner* — Chi Pham
*Assistant Examiner* — Alexander Boakye
(74) *Attorney, Agent, or Firm* — Shumaker & Sieffert, P.A.

(57) ABSTRACT

A network analyzer includes a hardware-based accounting engine that generates accurate statistics for traffic within a computer network. As the network analyzer receives packets, the accounting engine associates the network packets with respective routing prefixes, and updates flow statistics for the routing prefixes. In this manner, the accounting engine maintains accurate flow statistics for all packets received by network analyzer. The network analyzer includes a control unit that generates prefix data to control the granularity of the traffic analysis. The control unit analyzes the flow statistics maintained by the accounting engine, and adaptively updates the set of prefixes to control the granularity of the statistics. The control unit may generate the prefix data as a forwarding tree having resolution nodes. Each node may associate a network prefix with forwarding next hop data, as well as respective analysis control data to enable or disable flow analysis for the prefix.

18 Claims, 6 Drawing Sheets

U.S. PATENT DOCUMENTS

| | | |
|---|---|---|
| 6,590,898 B1 | 7/2003 | Uzun |
| 6,594,268 B1 | 7/2003 | Aukia et al. |
| 6,598,034 B1 | 7/2003 | Kloth |
| 6,651,098 B1 | 11/2003 | Carroll et al. |
| 6,735,201 B1 | 5/2004 | Mahajan et al. |
| 6,751,663 B1 | 6/2004 | Farrell et al. |
| 6,826,713 B1 | 11/2004 | Beesley et al. |
| 6,870,817 B2 | 3/2005 | Dolinar et al. |
| 6,889,181 B2 | 5/2005 | Kerr et al. |
| 6,970,943 B1 | 11/2005 | Subramanian et al. |
| 6,975,628 B2 | 12/2005 | Johnson et al. |
| 6,983,294 B2 | 1/2006 | Jones et al. |
| 6,985,956 B2 | 1/2006 | Luke et al. |
| 7,031,304 B1 | 4/2006 | Arberg et al. |
| 7,055,174 B1 | 5/2006 | Cope et al. |
| 7,058,974 B1 | 6/2006 | Maher, III et al. |
| 7,114,008 B2 | 9/2006 | Jungck et al. |
| 7,120,931 B1 | 10/2006 | Cheriton |
| 7,185,103 B1 | 2/2007 | Jain |
| 7,185,368 B2 | 2/2007 | Copeland, III |
| 7,203,740 B1 | 4/2007 | Putzolu et al. |
| 7,231,459 B2 | 6/2007 | Saraph et al. |
| 7,251,215 B1 | 7/2007 | Turner et al. |
| 7,254,114 B1 | 8/2007 | Turner et al. |
| 7,292,573 B2 | 11/2007 | LaVigne et al. |
| 7,313,100 B1 | 12/2007 | Turner et al. |
| 7,362,763 B2 | 4/2008 | Wybenga et al. |
| 7,369,557 B1 | 5/2008 | Sinha |
| 7,386,108 B1 | 6/2008 | Zave et al. |
| 7,433,966 B2 | 10/2008 | Charny et al. |
| 7,496,650 B1 | 2/2009 | Previdi et al. |
| 7,496,955 B2 | 2/2009 | Akundi et al. |
| 7,561,569 B2 | 7/2009 | Thiede |
| 7,580,356 B1 | 8/2009 | Mishra et al. |
| 2002/0095492 A1 | 7/2002 | Kaashoek et al. |
| 2002/0126621 A1 | 9/2002 | Johnson et al. |
| 2002/0141343 A1 | 10/2002 | Bays |
| 2002/0163932 A1 | 11/2002 | Fischer et al. |
| 2003/0005145 A1 | 1/2003 | Bullard |
| 2003/0097557 A1 | 5/2003 | Tarquini et al. |
| 2003/0120769 A1* | 6/2003 | McCollom et al. ............ 709/224 |
| 2003/0145232 A1 | 7/2003 | Poletto et al. |
| 2003/0214913 A1 | 11/2003 | Kan et al. |
| 2005/0160289 A1 | 7/2005 | Shay |
| 2006/0089994 A1 | 4/2006 | Hayes |
| 2007/0016702 A1 | 1/2007 | Pione et al. |
| 2007/0058558 A1 | 3/2007 | Cheung et al. |
| 2007/0076658 A1 | 4/2007 | Park et al. |
| 2007/0121812 A1 | 5/2007 | Strange et al. |
| 2007/0294369 A1 | 12/2007 | Ginter et al. |

FOREIGN PATENT DOCUMENTS

| | | | |
|---|---|---|---|
| WO | WO 02/084920 A2 | 10/2002 | |

OTHER PUBLICATIONS

"About Endace," www.endace.com.

"Cisco IOS NetFlow," www.cisco.com/warp/public/732/Tech/nmp/netflow/index.shtml.

"Well-Known TCP Port Number," www.webopedia/com, 2004, 3 pages.

"TCP Packet Field Descriptions," www.ipanalyser.co.uk, Analyser Sales Ltd., Copyright 2003, 2 pages.

Michael Egan, "Decomposition of a TCP Packet," www.passwall.com, 3 pages, Aug. 7, 2000.

Mark Gibbs, "A Guide to Original SYN," www.nwfusion.com, Network World, Nov. 2000, 4 pages.

"Sample TCP/IP Packet," www.passwall.com, Version 0.0.0 @ 03:55/08.07.2000, Copyright 2002, 6 pages.

D.J. Bernstein, "SYN Cookies," http://cr.yp.to/syncookies.html, Oct. 2003, 3 pages.

Jonathan Lemon, "Resisting SYN Flood DoS Attacks with a SYN Cache," http://people.freebsd.org/~jlemon/papers/syncache.pdf, 9 pages.

Stuart Staniford, et al., "Practical Automated Detection of Stealthy Portscans," http://downloads.securityfocus.com/library/spice-ccs2000.pdf, 16 pages.

Weaver, A.C. et al., "A Real-Time Monitor for Token Ring Networks," Military Communications Conference, 1989. MILCOM '89, Oct. 1989, vol. 3, pp. 794-798.

Dini, P. et al., "Performance Evaluation for Distributed System Components," Proceedings of IEEE Second International Workshop on Systems Management, Jun. 1996, pp. 20-29.

Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.

U.S. Appl. No. 11/744,982, entitled "Adaptive Network Router," filed May 7, 2007, Turner et al.

U.S. Appl. No. 10/916,021, entitled "Stateful Firewall Protection for Control Plane Traffic Within a Network Device", filed Aug. 11, 2004, Krohn et al.

U.S. Appl. No. 11/951,530, entitled "Network Device Having Accounting Service Card," filed Dec. 6, 2007, Turner et al.

PCI Technology Overview, Feb. 2003, www.cs.unc.edu/Research/stc/FAQs/pci-overview,pdf, 22 pgs.

Juniper Networks, Inc., "Combating Bots and Mitigating DDoS Attacks", Juniper Networks, Inc., 2008, entire document, http://www.juniper.net/solutions/literature/solutionbriefs/351198.pdf.

Office Action from U.S. Appl. No. 12/364,912, dated Apr. 20, 2010, 18 pp.

Response to Office Action dated Apr. 20, 2010, from U.S. Appl. No. 12/364,912, filed Jun. 30, 2010, 7 pp.

Office Action from U.S. Appl. No. 11/516,878, dated Apr. 16, 2010, 39 pp.

Response to Office Action dated Apr. 20, 2010, from U.S. Appl. No. 11/516,878, filed May 24, 2010, 13 pp.

Notice of Allowance from U.S. Appl. No. 11/516,878, mailed Jun. 14, 2010, 8 pp.

Notice of Allowance for U.S. Appl. No. 12/364,912 dated Sep. 2, 2010, 13 pgs.

* cited by examiner

| FLOW CRITERIA | PACKET COUNT | BYTE COUNT |
|---|---|---|
| 192.168/16 | 540452 | 7321042 |
| 192.168.1/24 | 1086358 | 14563004 |
| 192.168.1/24 | 1056 | 10672 |
| 192.168.1/24 | 2067 | 32046 |
| 192.168.1.254. 10.0.0.1.TCP/72 | 10456 | 156345 |
| 192.168.1.254. 10.0.0.1.TCP. HTTP/88 | 4045 | 63526 |
| 192.168.1.254. 10.0.0.1.TCP. HTTPS/88 | 60524 | 845622 |
| 192.168.1.254. 10.0.0.1.TCP. HTTP. 3072/104 | 7745 | 924450 |

ADAPTIVE NETWORK FLOW ANALYSIS

This application is a continuation of U.S. application Ser. No. 10/188,567, filed Jul. 2, 2002, the entire contents of which is incorporated herein by reference.

TECHNICAL FIELD

The invention relates to computer networks, and more particularly, to techniques for analyzing traffic flow within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Transmission Control Protocol/Internet Protocol (TCP/IP).

A system administrator or other user often makes use of a network analyzer to monitor network traffic and debug network problems. In general, a network analyzer is a tool that captures data from a network and displays the data to the user. The network analyzer typically allows the user to browse the captured data, and view summary and detail information for each packet. Accordingly, the user can view the network traffic flowing between devices on the network. The information collected during traffic flow analysis may be used for network planning, traffic engineering, network monitoring, usage-based billing and the like. Many conventional network analyzers, such as NetFlow, NeTraMet and FlowScan, use software applications to collect traffic flow information.

The analyzers typically monitor and collect packets having routing information that matches criteria specified by the system administrator. For example, the system administrator may specify a source and destination Internet Protocol (IP) addresses, source and destination port numbers, protocol type, type of service (ToS) and input interface information. The analyzers typically collect packets matching the specified criteria, and construct flow analysis diagrams. Consequently, typical network analyzers only provide traffic flow statistics for the specified packet flows, and do not provide sufficient insight into traffic conditions across large networks. In addition, the network analyzers may make use of sampling techniques to selectively sample the packets, and present a statistically generated view of the traffic within the network. As a result, the statistics generated by the network analyzer may not only be limited to specified flows, but may be relatively inaccurate.

SUMMARY

In general, the invention is directed to techniques for monitoring and analyzing a network. A network analyzer in accordance with the principles of the invention includes a hardware-based accounting engine that generates accurate statistics for traffic within the network. More specifically, the network analyzer includes counters that maintain flow statistics for a set of routing prefixes that represent the topology of the network. As the network analyzer receives packets, the accounting engine associates the network packets with respective routing prefixes, and updates the flow statistics for the routing prefixes. For example, the accounting engine may maintain an accurate packet count and byte count for each routing prefix. In this manner, the accounting engine maintains accurate flow statistics for all packets received by network analyzer.

The network analyzer includes a control unit that receives the flow statistics, and regenerates prefix data to control the granularity of the traffic analysis, i.e., to the resolution of the packet flows for which statistics are maintained. More specifically, the control unit analyzes the flow statistics accurately maintained by the accounting engine, and adaptively updates the set of prefixes specified by the prefix data to control the granularity of the statistics. The control unit may generate the prefix data as a forwarding tree having resolution nodes. Each node may associate a network prefix with forwarding next hop data, as well as respective analysis control data, to enable or disable flow analysis for the prefix.

In one embodiment, a method comprises receiving, with a first network device, routing information from a second network device in accordance with a routing communication protocol, generating, with the first network device, a data structure of routing prefixes for which traffic flow statistics will be collected based on at least the routing information received from the second device, collecting, with the first network device, traffic flow statistics for the routing prefixes of the data structure, analyzing, with the first network device, the collected traffic flow statistics to identify traffic load characteristics and updating, with the first network device, the data structure to control granularity of the traffic flow statistics based on the identified traffic load characteristics.

In another embodiment, a network device includes a control unit that receives routing information from a second network device in accordance with a routing communication protocol and generates a data structure of routing prefixes for which traffic flow statistics will be collected based on at least the routing information received from the second device and an accounting engine that collects traffic flow statistics for the routing prefixes of the data structure. The control unit analyzes the collected traffic flow statistics to identify traffic load characteristics and updates the data structure to control granularity of the traffic flow statistics based on the identified traffic load characteristics.

The techniques may provide one or more advantages. For example, the described techniques do not rely on traffic sampling to calculate statistically generated views of the traffic patterns within the network. In other words, the techniques provide accurate statistics for the network in which each packet is associated with a prefix and used to update the traffic statistics. The techniques may be useful in detecting network errors, heavy traffic flow, or other conditions, allowing a system administrator to taking early action to correct such conditions.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
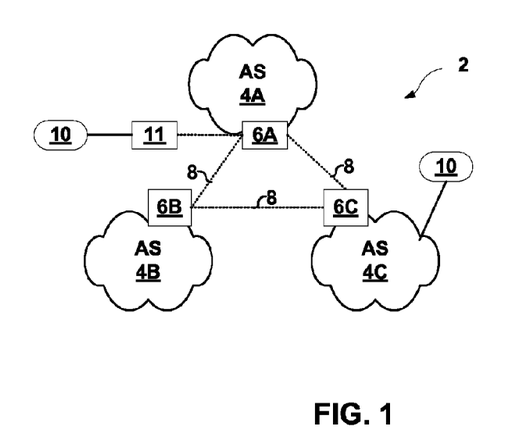
FIG. 1 is a block diagram illustrating an exemplary computing network formed by an interconnected group of autonomous systems.

FIG. 1 illustrates an exemplary computing network 2 formed by an interconnected group of autonomous systems 4A-4C (herein autonomous systems 4). Each of autonomous systems 4 represents an independent administrative domain having a variety of networked resources capable of packet-based communication. For example, autonomous systems 4 may include servers, workstations, network printers and faxes, gateways, routers, and the like. Each autonomous system 4 includes at least one router 6 for sharing routing information with, and forwarding packets to, the other autonomous systems via links 8.

Network analyzer 11 is coupled to network 2 for monitoring and capturing network traffic. As described, network analyzer 11 includes a hardware-based accounting engine that generates accurate statistics for traffic within network 2. More specifically, network analyzer 11 maintains flow statistics for a set of routing prefixes that represent the topology of network 2. As network analyzer 11 receives packets, the accounting engine associates the network packets with respective routing prefixes, and updates the flow statistics for the routing prefixes. For example, the accounting engine may maintain an accurate packet count and byte count for each routing prefix. In this manner, the accounting engine maintains accurate flow statistics for all packets received by network analyzer 11.

Network analyzer 11 may support a number of protocols for exchanging routing information with routers 6, as well as routers (not shown) internal to autonomous systems 4A, in order to generate an initial set of network prefixes. For example, network analyzer may support the Border Gateway Protocol (BGP), for exchanging routing information with routers 6 of autonomous systems 4. Similarly, network analyzer 11 may support the Intermediate System to Intermediate System protocol (IS-IS), which is an interior gateway routing protocol for communicating link-state information within an autonomous system. Other examples of interior routing protocols include the Open Shortest Path First (OSPF), and the Routing Information Protocol (RIP).

Network analyzer 11 may also receive routing information from clients 10, which may be a user, such as a system administrator, or a software application or scripting utility executing within a computing environment. Clients 10 may directly provide the routing information to network analyzer 11, e.g., via a keyboard, mouse or other input mechanism. In addition, clients 10 may remotely provide the routing information to network analyzer 11 via a remote management protocol. Accordingly, network analyzer 11 need not support routing control protocols.

In accordance with the routing information, network analyzer 11 generates and maintains a set of prefixes for selective traffic analysis. The granularity of the flow statistics produced by the accounting engine directly correlate with the granularity of the routing prefixes. In other words, a routing prefix may be specified within a range of granularity that controls the association of packet flows with the prefix. The accounting engine extracts routing information from each packet, and compares the routing information with the prefixes to associate the packet with one of the prefixes.

For example, specification of a prefix as 11/8 directs the accounting engine to associate with the prefix all packets in which the first eight (8) bits of the routing information equals eleven (11). In this manner, a large number of packet flows can be aggregated and accurately counted. As another example, a prefix of 11.0.0.1/32 directs the accounting engine to associates with the prefix all packets in which the first thirty-two (32) bits of the routing information equals 11.0.0.1. The prefixes may be further defined to capture very specific packet flows. For example, in one embodiment, network analyzer 11 supports specification of a routing prefix so as to include a destination address, a source address, a communication protocol, a source port, and a destination port. Consequently, network analyzer 11 generates accurate flow statistics for a set of routing prefixes that represent the topology of network 2.

Figure 2:
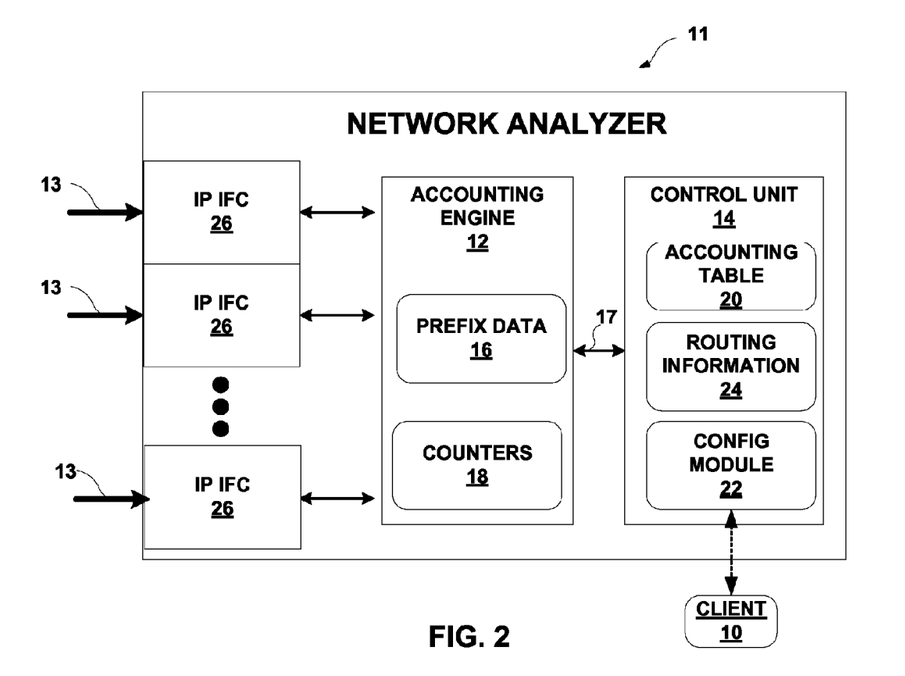
FIG. 2 is a block diagram illustrating an example embodiment of a network analyzer consistent with the principles of the invention.

FIG. 2 is a block diagram illustrating an example embodiment of a network analyzer 11 consistent with the principles of the invention. In the exemplary embodiment, network analyzer 11 includes one or more interface cards (IFCs) 26 for communicating packets between the network analyzer and network 2.

Network analyzer 11 includes a hardware-based accounting engine 12 that generates accurate statistics for traffic within network 2. In particular, accounting engine 12 includes a number of counters 18 that maintain accurate flow statistics for all traffic received by network analyzer 11. As network analyzer 11 receives packets, accounting engine 12 associates each of the network packets with a respective routing prefix specified by prefix data 16, and updates the flow statistics for the routing prefixes. Accounting engine 12 may, for example, maintain a packet count and a byte count for each routing prefix specified by prefix data 16. In this manner, accounting engine 12 maintains accurate flow statistics for all packets received by network analyzer 11 via interface cards 26, and can provide flow statistics for packet flows throughout network 2.

Network analyzer 11 includes a control unit 14 that receives the flow statistics maintained by counters 18, and regenerates prefix data 16 to control the granularity of the traffic analysis. More specifically, control unit 14 analyzes the flow statistics accurately maintained by accounting engine 12, and adaptively updates the set of prefixes specified by prefix data to control the granularity of the statistics. As control unit 14 adaptively updates prefix data 16, the total statistics for the observed network traffic, such as total packet count and total byte count, will not change.

Control unit 14 regenerates prefix data 16 from routing information 24 to adaptively control the association of the packets with the set of prefixes. Control unit 14 maintains routing information 24 to reflect the current network topology. Control unit 14 receives update messages from other routers in accordance with routing protocols, such as BGP, IS-IS, RIP, and the like. These messages may, for example, advertise or withdraw routes or carry other network information, such as link state information. By generating the prefix data 16 from routing information 24, control unit 14 can control the granularity at which accounting engine 12 maintains traffic flow statistics for received packets.

As an example, control unit 14 may analyze the statistics maintained by counters 18 and identify a prefix for an autonomous system having a traffic characteristic of interest, such as a heavy traffic load. Control unit 14 may examine routing information 24, and may identify one or more finer-grain prefixes for the autonomous system. For example, an autonomous system, e.g., autonomous system 4C, may be initially represented within prefix data 16 by a high level routing prefix, such as 11.0.0.1/8. Upon detecting significant traffic volumes, control unit 14 may analyze routing information 24 and update prefix data 16 to include additional prefixes, such as 11.150.14.1/32, 11.0.0.1/32, and the like. Similarly, control unit 14 may identify prefixes having relatively low levels of traffic, and may selectively remove the prefixes from prefix data 16.

Furthermore, control unit 14 may update the set of prefixes specified by prefix data 16 in response to input from client 10. Configuration module (config module) 22 provides an interface for receiving commands from client 10, which may be a user or an automated script. In response, config module 22 inserts or removes prefixes from prefix data 16.

Control unit 14 maintains an accounting table 20 based on the traffic flow statistics received from counters 18. When control unit 14 removes a prefix from prefix data 16, the control unit copies the respective statistics from counters 18 into accounting table 20. In this fashion, accounting table 20 preserves total statistics for the traffic flow of the network.

In one embodiment, network analyzer 11 may comprise a fully functional router dedicated for traffic analysis. In other words, accounting engine 12 may take the form of a forwarding engine dedicated for generating traffic monitoring for select packet flows. In this embodiment, control unit 14 may generate prefix data 16 in the form of forwarding information that associates network prefixes to specific interface ports at IFCs 26, even though accounting engine 12 may not actually forward any received packets. Control unit 14 communicates the prefix data to accounting engine 12 via communication channel 17. Prefix data 16 may, therefore, be thought of as a subset of the information contained within routing information 24. In addition, control unit 14 generates prefix data 16 to include analysis control data for selectively enabling or disabling traffic monitoring for the set of prefixes specified by prefix data 16.

In one embodiment, control unit 14 generates prefix data 16 in the form of a tree data structure having a set of route resolution nodes. Each node is associated with a prefix, and contains respective analysis control data for enabling and disabling traffic flow analysis for the respective prefix. In addition, each node contains forwarding data specifying an outbound interface port of IFCs 26.

Upon receiving an inbound packet, accounting engine 12 retrieves and reads a block of data corresponding to the packet, referred to as the "key," that includes a network destination. The key may, for example, contain a routing prefix for another router within the network. Accounting engine 12 traverses prefix data 16 to resolve the key to a resolution node. Accounting engine 12 updates counters 18 when the analysis control data for the node enables traffic analysis for the prefix, and may forward the packet via the specified outbound interface port. Alternatively, network analyzer 11 may operate simply as a dedicated network analysis device without incorporating routing functionality. In this configuration, network analyzer 11 may simply disregard packets after updating counters 18. This may be beneficial in that network analyzer 11 need not only maintain a limited number of installed prefixes, and need not maintain complete routing information. Consequently, network analyzer 11 may be viewed as a router that dynamically updates prefix data 16 based on analysis of traffic and not necessarily control information received from other routing devices via a routing protocol.

Each of accounting engine 12 and control unit 14 may comprise one or more dedicated processors, hardware, and the like, and may be communicatively coupled by data communication channel 17. Data communication channel 17 may be a high-speed network connection, bus, shared-memory or other data communication mechanism. The example architecture of network analyzer 11 is for exemplary purposes only; the invention is not limited to this architecture. In alternate embodiments, network analyzer 11 may be configured in a variety of ways. In one embodiment, control unit 14 and its corresponding functionality may be replicated and incorporated directly within IFCs 26.

Figure 3:
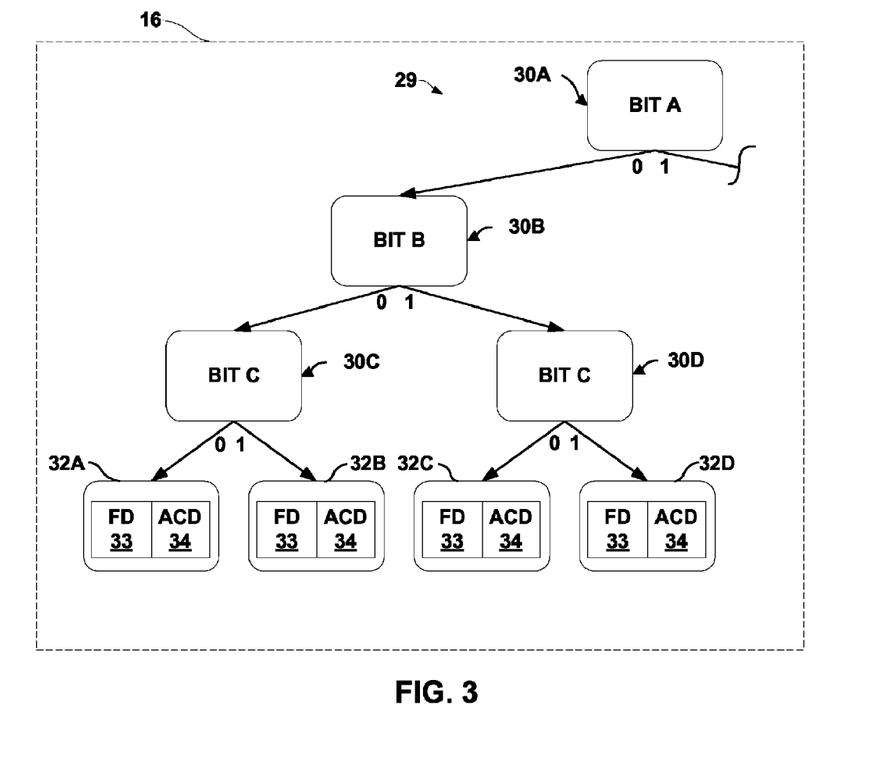
FIG. 3 is a block diagram illustrating an example data structure for storing prefix data.

FIG. 3 is a block diagram illustrating example data structures for one arrangement of prefix data 16. In the illustrated embodiment, control unit 14 generates prefix data 16 as a radix tree 29 that associates network prefixes to resolution nodes 32A-32D (collectively resolution nodes 32). Each of resolution nodes 32 may correspond to a network destination, such as a prefix for a router within the network. For large networks, radix tree 29 can become sizable and may easily include over 300,000 resolution nodes 32. Consequently, for exemplary purposes, FIG. 2 depicts only a portion of radix tree 29. The arrangement of prefix data 16 as a radix tree is illustrated for exemplary purposes. The principles of invention may readily be applied to other arrangements. Prefix data 16 may be arranged, for example, as a number of tables, link lists, and other data structures.

Upon receiving an inbound packet, accounting engine 12 reads a routing key from the packet, i.e., a block of data that specifies a network destination, such as a routing prefix. Accounting engine 12 resolves the key to one of resolution nodes 32 by traversing radix tree 29. In particular, accounting engine 12 traverses radix tree 29 by testing bits A, B and C, which represent any bits within the key. Based on the value of each bit A, B, C, control unit 14 follows the links of radix tree 29 through the various levels until reaching one of resolution nodes 32.

Resolution nodes 32 include respective forwarding data (FD) 33 indicating a port of one of IFCs 26 for reaching the specified network destination. In addition, resolution nodes 32 include analysis control data (ACD) 34 for selectively enabling and disabling traffic monitoring for the respective network destination as specified by the associated prefix. ACD 34 may, for example, comprise a single bit in which a first logical state indicates traffic analysis is enabled for the respective prefix, while a second logical state indicates traffic analysis is disabled.

Upon resolving a key of an inbound packet to one of resolution nodes 32A, 32B and 32C, accounting engine 12 selectively updates counters 18. For example, counters 18 may be implemented in hardware, and accounting engine 12 may selectively toggle one or more enable bits to control counters 18. When enabled, counters 18 may automatically count the number of bytes as well as the number of packets destined for a particular prefix.

Figure 4A:
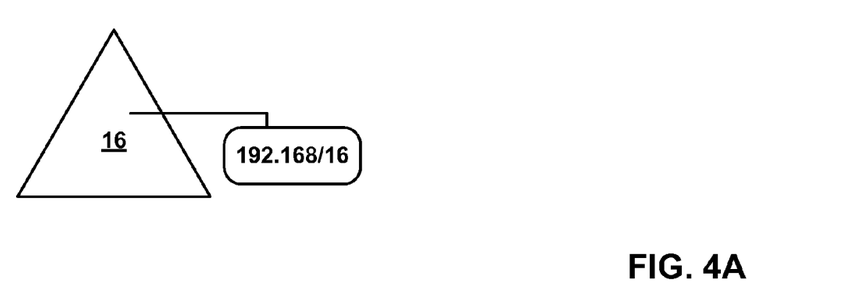
FIGS. 4A-4C are block diagrams that provide a high-level overview of the operation of network analyzer.
Figure 4B:
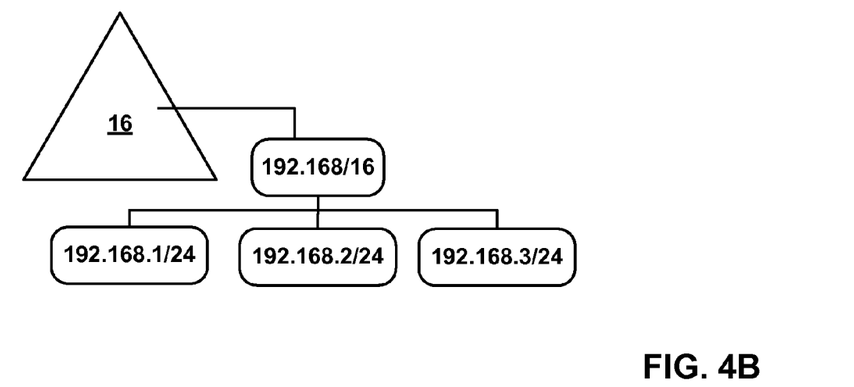
Figure 4C:
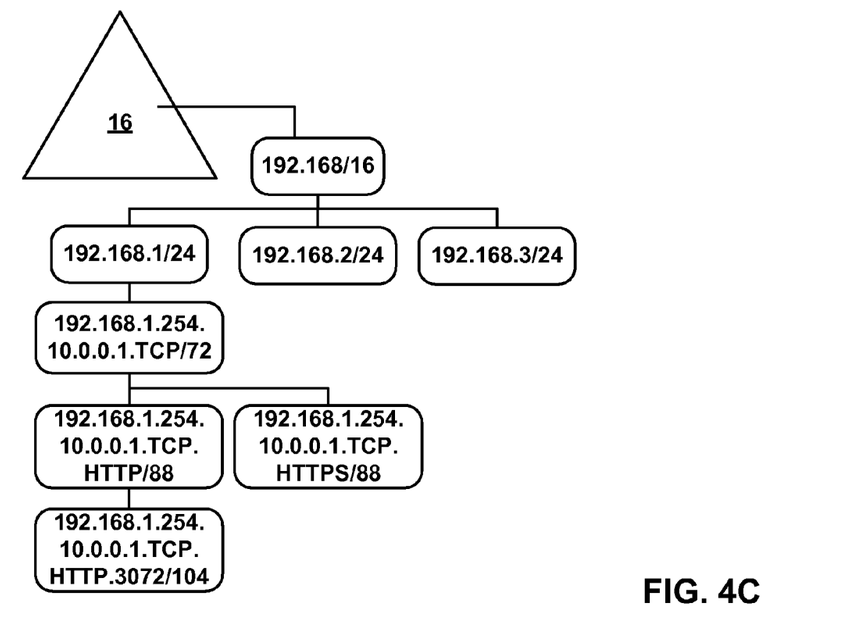

FIGS. 4A-4C are block diagrams that provide a high-level overview of the operation of network analyzer 11. In particular, FIG. 4A illustrates prefix data 16 as a radix tree having a resolution node that specifies prefix 192.168/16. After accounting engine 12 monitors network traffic and maintains traffic flow statistics, control unit 14 may analyze the statistics and elect to refine the analysis of the packet flow associated with the prefix 11/8. Consequently, control unit 14 may analyze routing information 24, and regenerate prefix data 16 to include more specific resolution nodes for prefix 192.168.1/24, 192.168.2/24 and 192.168.3/24. In response, accounting engine 12 allocates one of counters 18 for the newly inserted prefix, and maintains traffic flow statistics for the newly inserted prefixes. Packets that satisfy prefix 192.168/16, but that do not satisfy the newly inserted prefixes, are associated with the prefix 192.168/16, and used to update the respective one of counters 18 allocated to prefix 192.168/16.

As illustrated in FIG. 4C, control unit 14 may refine the analysis over time by updating prefix data 16 to provide significant granularity of the packet flows associated with 192.168.1/24. For example, control unit 14 may insert a packet flow that includes a 72-bit prefix formed by a source and destination network address, and an identifier for the protocol type, i.e., 192.168.1.254.10.0.1.TCP/72. Control unit 14 may further refine the granularity of the traffic analysis by inserting prefixes 192.168.1.254.10.0.1.TCP.HTTP/88 and 192.168.1.254.10.0.1.TCP.HTTPS/88. Finally, control unit 14 may insert a 104-bit prefix that also specifies a source and destination port numbers, i.e., 192.168.1.254.10.0.1.TCP.HTTP.3072/104. Other routing information within the packet may readily be used, such as MPLS labels, VPN labels, Class of Service (Cos) information, and the like. In this manner, accounting engine 12 may generate fine-grain statistics for particularized packet flows, yet maintain accurate information without resorting to statistical sampling.

Figure 5:
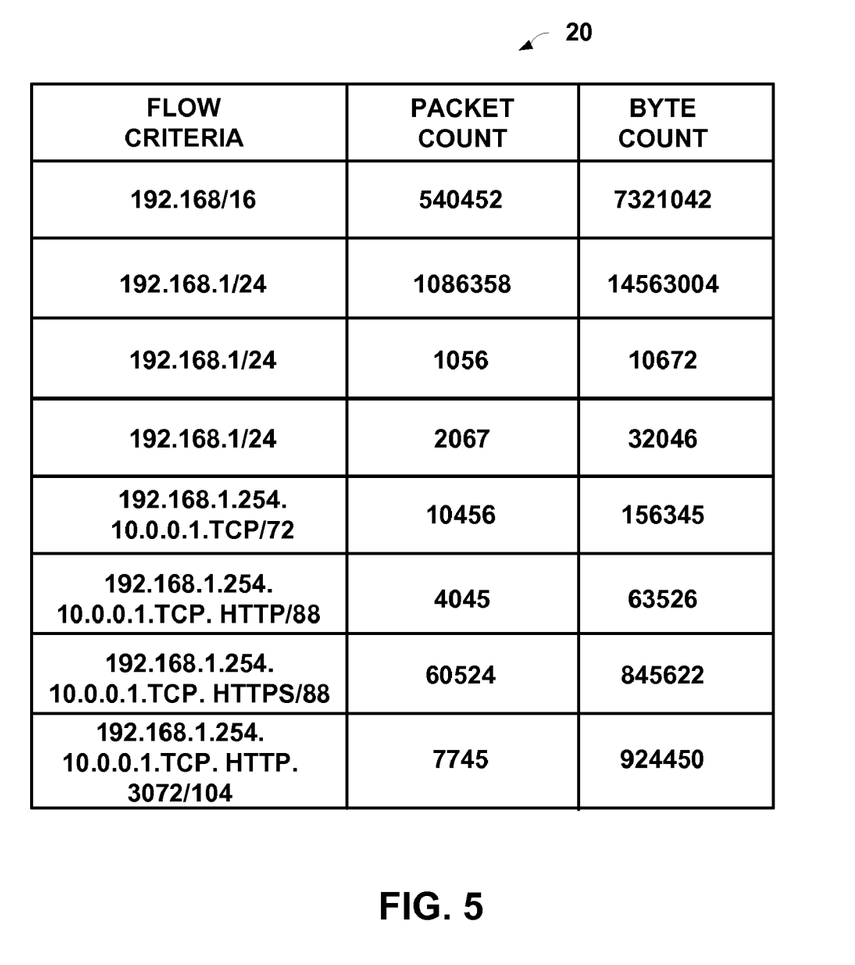
FIG. 5 illustrates an example embodiment for an accounting table maintained by a control unit within the network analyzer to log and preserve statistics for the traffic flow of the network.

FIG. 5 illustrates an example embodiment for accounting table 20 maintained by control unit 14 to log and preserves total statistics for the traffic flow of the network. In the illustrated example, accounting table 20 includes a packet count seven (7) prefixes, and records a packet count and a byte count for each prefix as received from counters 18. As described, control unit 14 manages accounting table 20 to preserve the total statistics for the traffic flow of the network, and may update the accounting table upon receiving network statistics from accounting engine 12. Control unit 14 may purge accounting table 20, such as in response to a request from client 10, in order to clear a statistical record.

Figure 6:
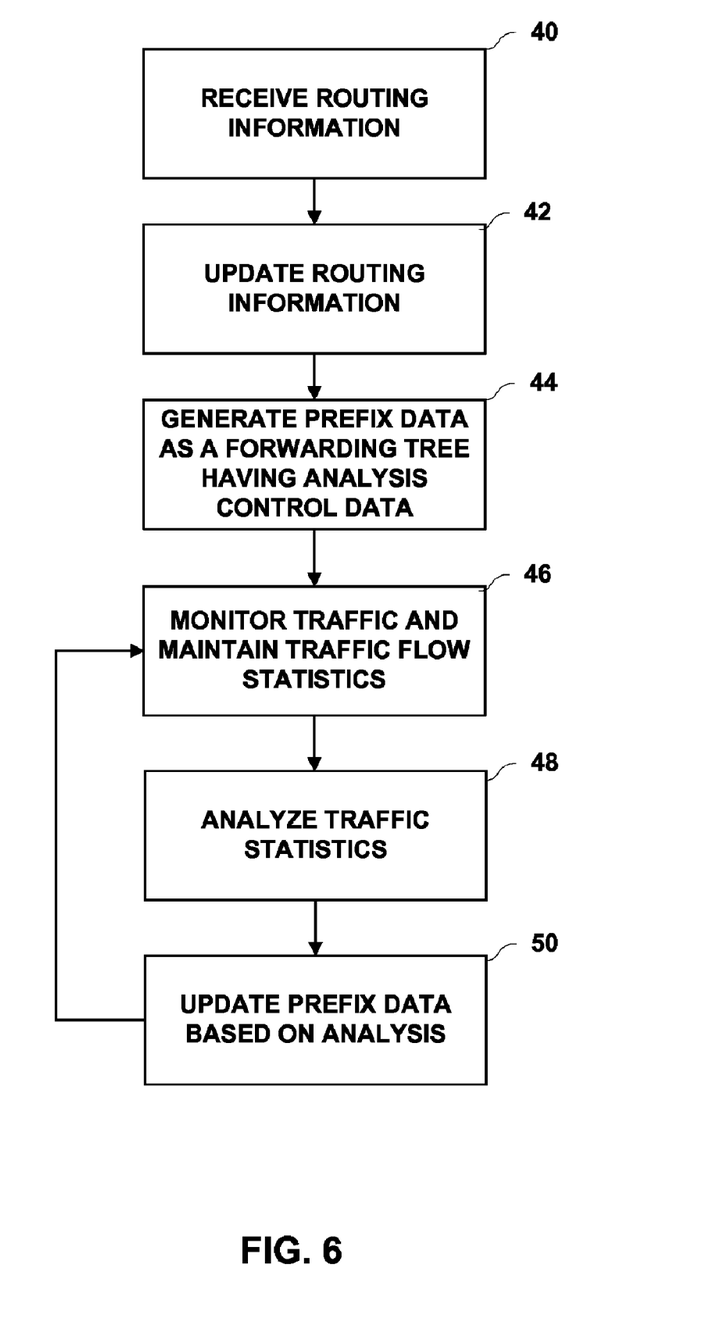
FIG. 6 is a flowchart providing a high-level overview of the operation of a network analyzer.

FIG. 6 is a flowchart providing a high-level overview of the operation of network analyzer 11. Although illustrated for exemplary purposes in reference to a fully functional routing device, the techniques are not so limited.

Initially, control unit 14 receives network messages from other routing devices carrying routing information (40). As described above, network analyzer 11 may support a number of protocols for exchanging routing information other routing devices, such as BGP, IS-IS, OSPF, and RIP. Network analyzer 11 may also receive routing information from clients 10, which may be a user, such as a system administrator, or a software application or scripting utility executing within a computing environment.

Based on the messages, control unit 14 updates routing information 24 to represent the topology of the network (42). Next, control unit 14 generates prefix data 16, possibly in the form of a forwarding tree (44). In particular, control unit 14 performs route resolution to associate network destinations with respective "forwarding next hops" (FNH). A FNH for a given route typically refers to a neighboring router physically coupled to the source router along that route. For example, the FNH for a route may specify a physical interface and media access control (MAC) address for the interface associated with the router. Control unit 14 may generate the forwarding tree to include a number of resolution nodes, each node associating a network prefix with forwarding next hop data, as well as respective analysis control data to enable or disable flow analysis for the prefix.

Control unit 14 communicates the forwarding tree to accounting engine 12, which monitors network traffic and maintains traffic flow statistics in accordance with the analysis control data (46). At a subsequent time, control unit 14 analyzes the traffic flow statistics (48), and updates prefix data 16. As described above, control unit 14 may issue messages that direct accounting engine 12 to change the state of analysis control data for any resolution nodes. Control unit 14 may regenerate prefix data 16 to insert or remove resolution nodes, thereby adding or removing prefixes from the set of analyzed prefixes.

Figure 7:
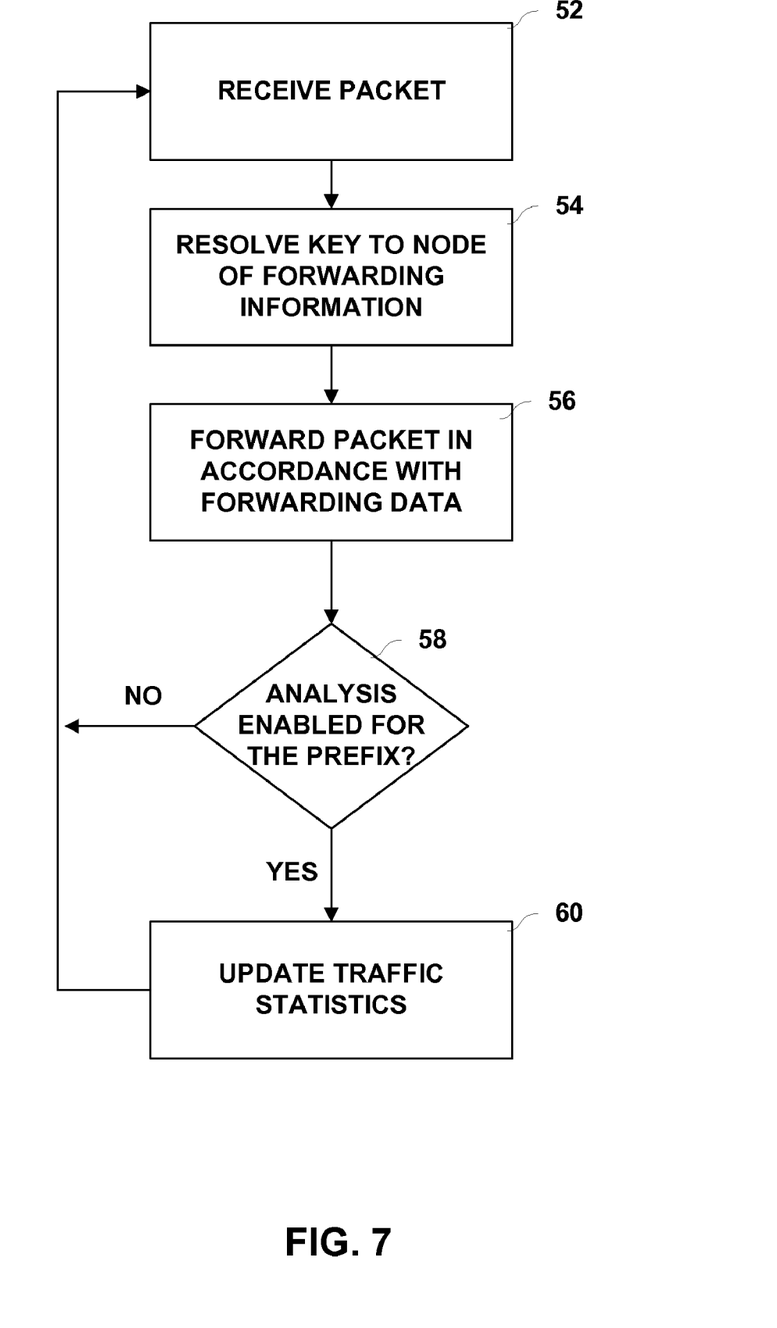
FIG. 7 is flowchart illustrating the operation of an accounting engine within the network analyzer.

FIG. 7 is flowchart further illustrating the operation of accounting engine 12. Upon receiving a packet from the network (52), accounting engine 12 extracts the routing key from the packet and traverses prefix data 16 to resolve the key to one of the leaf nodes. In this manner, accounting engine typically associates a routing prefix specified by the key with respective forwarding data and analysis control data (54). Next, accounting engine 12 may forward the packet in accordance with the forwarding data (56).

Finally, accounting engine 12 determines whether flow analysis is enabled for the prefix based on the analysis control data (58). If so, accounting engine updates counters 18, e.g., incrementing a packet count and updating a byte count for the prefix.

Various embodiments of the invention have been described. These and other embodiments are within the scope of the following claims.

The invention claimed is:

1. A method comprising:
   receiving, with a first network device, routing information from a second network device in accordance with a routing communication protocol;
   generating, with the first network device, a data structure of routing prefixes for which traffic flow statistics will be collected based on at least the routing information received from the second device;
   collecting, with the first network device, traffic flow statistics for the routing prefixes of the data structure;
   analyzing, with the first network device, the collected traffic flow statistics to identify a heavy traffic load associated with one of the routing prefixes of the data structure; and
   updating, with the first network device, the data structure to control granularity of the traffic flow statistics by inserting at least one additional routing prefix into the data structure, wherein the at least one additional routing prefix includes a first N bits of routing information associated with the prefix and the routing prefix associated with the heavy traffic load includes a first M bits of the routing information associated with the prefix, and N is greater than M.

2. The method of claim 1, further comprising:
   analyzing the collected traffic flow statistics to identify a low level of traffic associated with one of the routing prefixes of the data structure; and
   removing the routing prefix associated with the low level of traffic from the data structure.

3. The method of claim 2, further comprising storing the collected traffic flow statistics associated with the removed routing prefix in association with a different one of the routing prefixes within the data structure.

4. The method of claim 1, further comprising updating the data structure to insert or remove routing prefixes based on one of routing information received from other devices and input received from a user.

5. The method of claim 1, wherein the data structure comprises a hierarchical data structure having nodes that associate the routing prefixes with analysis control data that selectively enables traffic flow analysis for respective routing prefixes, the method further comprising:
identifying whether to calculate network traffic flow statistics for the routing prefixes based on the analysis control data of respective nodes; and
calculating network traffic flow statistics for the routing prefixes in accordance with the analysis control data.

6. The method of claim 1, wherein the nodes of the hierarchical data structure associate the routing prefixes with forwarding next hops, the method further comprising forwarding the packets in accordance with the forwarding next hops associated with the routing prefixes.

7. The method of claim 1, wherein the routing prefixes identify at least a portion of a destination address, a source address, a communication protocol, a source port, and a destination port.

8. The method of claim 1, wherein generating the data structure of routing prefixes comprises generating forwarding information that associates routing prefixes for network destinations with next hops for respective routes through a network, wherein the forwarding information includes: (i) forwarding data to control forwarding traffic having the routing prefixes, and (ii) analysis control data for selectively enabling traffic flow analysis for individual ones of the routing prefixes.

9. A method comprising:
receiving, with a first network device, routing information from a second network device in accordance with a routing communication protocol;
generating, with the first network device, a data structure of routing prefixes for which traffic flow statistics will be collected based on at least the routing information received from the second device;
collecting, with the first network device, traffic flow statistics for the routing prefixes of the data structure;
analyzing, with the first network device, the collected traffic flow statistics to identify a low level of traffic associated with one of the routing prefixes of the data structure;
updating, with the first network device, the data structure to remove the routing prefix associated with the low level of traffic from the data structure; and
continuing to collect traffic flow statistics for packets having the removed routing prefix using a different routing prefix within the data structure, wherein the different routing prefix includes a first N bits of routing information associated with the prefix and the removed routing prefix includes a first M bits of the routing information associated with the prefix, and N is less than M.

10. A network device comprising:
a control unit that receives routing information from a second network device in accordance with a routing communication protocol and generates a data structure of routing prefixes for which traffic flow statistics will be collected based on at least the routing information received from the second device; and
an accounting engine that collects traffic flow statistics for the routing prefixes of the data structure,
wherein the control unit analyzes the collected traffic flow statistics to identify a heavy traffic load associated with one of the routing prefixes of the data structure and inserts at least one additional routing prefix into the data structure, and
wherein the at least one additional routing prefix includes a first N bits of routing information associated with the prefix and the routing prefix associated with the heavy traffic load includes a first M bits of the routing information associated with the prefix, and N is greater than M.

11. The device of claim 10, wherein the control unit analyzes the collected traffic flow statistics to identify a low level of traffic associated with one of the routing prefixes of the data structure and removes the routing prefix associated with the low level of traffic from the data structure.

12. The device of claim 11, wherein the accounting engine stores the collected traffic flow statistics associated with the removed routing prefix in association with a different one of the routing prefixes within the data structure.

13. The device of claim 10, wherein the control unit updates the data structure to insert or remove routing prefixes based on one of routing information received from other devices and input received from a user.

14. The device of claim 10,
wherein the data structure comprises a hierarchical data structure having nodes that associate the routing prefixes with analysis control data that selectively enables traffic flow analysis for respective routing prefixes,
wherein the accounting engine identifies whether to calculate network traffic flow statistics for the routing prefixes based on the analysis control data of respective nodes and calculates network traffic flow statistics for the routing prefixes in accordance with the analysis control data.

15. The device of claim 10,
wherein the nodes of the hierarchical data structure associate the routing prefixes with forwarding next hops,
wherein the accounting engine forwards the packets in accordance with the forwarding next hops associated with the routing prefixes.

16. The device of claim 10, wherein the routing prefixes identify at least a portion of a destination address, a source address, a communication protocol, a source port, and a destination port.

17. The device of claim 10, wherein the control unit generates forwarding information that associates routing prefixes for network destinations with next hops for respective routes through a network, wherein the forwarding information includes: (i) forwarding data to control forwarding traffic having the routing prefixes, and (ii) analysis control data for selectively enabling traffic flow analysis for individual ones of the routing prefixes.

18. A network device comprising:
a control unit that receives routing information from a second network device in accordance with a routing communication protocol and generates a data structure of routing prefixes for which traffic flow statistics will be collected based on at least the routing information received from the second device; and
an accounting engine that collects traffic flow statistics for the routing prefixes of the data structure,
wherein the control unit analyzes the collected traffic flow statistics to identify a low level of traffic associated with one of the routing prefixes of the data structure and removes the routing prefix associated with the low level of traffic from the data structure, and wherein the accounting engine continues to collect traffic flow statistics for packets having the removed routing prefix using a different routing prefix within the data structure, wherein the different routing prefix includes a first N bits of routing information associated with the prefix and the removed routing prefix includes a first M bits of the routing information associated with the prefix, and N is less than M.

* * * * *